United States Patent [19]

Clarkson et al.

[11] Patent Number: 4,789,859

[45] Date of Patent: Dec. 6, 1988

[54] ELECTRONIC LOCKING SYSTEM AND KEY THEREFOR

[75] Inventors: Bruce A. Clarkson, Beverly; Ronald J. Frere, Southampton, both of Mass.; Thomas G. Loughlin, Rocky Hill, Conn.; William W. Taylor, Jr., Golden, Colo.; Peter Mongeau, Needham, Mass.

[73] Assignee: Emhart Industries, Inc., Farmington, Conn.

[21] Appl. No.: 842,681

[22] Filed: Mar. 21, 1986

[51] Int. Cl.[4] ...................... H04Q 1/00; G06K 19/06; E05B 47/06

[52] U.S. Cl. ............................ 340/825.31; 340/825.3; 70/278; 361/172; 235/382

[58] Field of Search ................. 70/271, 277, 278, 362, 70/375, DIG. 46, DIG. 62; 235/382, 382.5, 443, 441; 361/171, 172; 340/825.3, 825.31, 825.5; 335/222, 223, 231

[56] References Cited

U.S. PATENT DOCUMENTS

| | | | |
|---|---|---|---|
| 3,798,398 | 3/1974 | Hills | 70/277 |
| 3,889,501 | 6/1975 | Fort | 70/405 |
| 4,200,227 | 4/1980 | Lemelson | 235/382 |
| 4,250,533 | 2/1981 | Nelson | 340/825.31 |
| 4,257,030 | 3/1981 | Bruhin et al. | 340/825.31 |
| 4,297,569 | 10/1981 | Flies | 235/443 |
| 4,326,125 | 4/1982 | Flies | 235/443 |
| 4,420,792 | 12/1983 | Anderson | 340/825.5 |
| 4,436,993 | 3/1984 | Flies | 235/382 |
| 4,578,573 | 3/1986 | Flies et al. | 235/492 |
| 4,603,564 | 8/1986 | Kleinhäny et al. | 70/282 |
| 4,686,358 | 8/1987 | Seckinger et al. | 235/382 |

FOREIGN PATENT DOCUMENTS

| | | | |
|---|---|---|---|
| 2155988A | 10/1985 | United Kingdom . | |
| 2158867 | 11/1985 | United Kingdom | 70/278 |

*Primary Examiner*—John W. Caldwell, Sr.
*Assistant Examiner*—Edwin C. Holloway, III
*Attorney, Agent, or Firm*—Barry E. Deutsch

[57] ABSTRACT

An electronic locking system including a lock cylinder having an electronically actuable release assembly which is selectively enabled to disengage a pin from a cylinder plug, to permit the rotation of the plug by an inserted key. The lock cylinder and key each contain non-volatile, electronically alterable memory devices, such as EEPROM integrated circuits, which house keying system codes. The key EEPROM is preferably housed within the key blade, in a key design which closely resembles a traditional mechanical key. The release mechanism incorporates a locking pin which is moveable between plug-engaging and non-engaging positions, along a radius of the lock cylinder. The release mechanism may include a primary actuator which directly moves the locking pin, or may act indirectly upon the locking pin via a latching member.

9 Claims, 14 Drawing Sheets

ELECTRONIC LOCKING SYSTEM AND KEY THEREFOR

BACKGROUND OF THE INVENTION

The present invention relates to electronic locking systems, and more particularly to electronic locking systems of a type including a reprogrammable key which electronically and mechanically interacts with a reprogrammable lock cylinder.

Electronic security systems have been well known for a number of years, and recent years have seen the marriage of electronic technology with traditional door locking devices such as mortise locks. Some of the early commercial systems have required a hard-wired connection between a central processor and the electronics of the locking systems of given doors. A disadvantage of such systems is the requirement of cable connections between the central controller and individual lock assemblies. This requires expensive remodelling, and such installations are vulnerable to tampering.

Other systems integrate hardware elements for control of functions of locking systems within the lock assembly itself, typically by housing circuit boards, power supplies, etc. within the door or in a module attached to the door. This approach also requires considerable remodeling of the installations to adapt to the specifications of the given locking systems. There is a need for improved locking systems which permit retrofitting of locking assemblies of a type compatible with traditional installations, thereby facilitating the conversion from traditional mechanical locking systems to electronic locks.

The use of innovative techniques for coding locks, such as for example optical, magnetic, electronic, and other techniques, offers the possibility of a number of significant advantages as compared with mechanical bitting. Electronic coding and the like holds the promise of increased information content with attendant improvements to system capabilities; the flexibility of recoding the cylinder or key (or both); networking with other electronic systems of an installation; effective new countermeasures against "lock-picking" attempts; and developments of versatile management systems for hotels and other institutions. Prior art electronic locking systems have just begun to realize some of these advantages, and are hindered by limitations on the loads of information exchanged between key and lock.

U.K. Patent Application GB No. 2112055A and Australian Patent Application AU-A No. 21588/83 disclose combination (cylinder plug) and "stator" (cylinder shell). The stator houses a solenoid-actuated locking bolt which is oriented parallel to the keyway and which has a retaining member at one end. The retaining member mates with a grooved blocking member fixed to the rotor, the cam groove being profiled to include a "blocking notch" (in 2112055A) or "retaining ring" (in 21588/03) which prevent rotation of the rotor in certain states of the solenoid.

U.K. Patent Application GB No. 2155988 A discloses a mechanical/electronic key in which an electronic assembly (such as a dual-in-line standard package integrated circuit is mounted in a casing which serves as the key grip. The casing is fixed to the key shank and includes a connecting part for electrical contacts. This application does not show the use of electronically eraseable programmable read-only-memory (EEPROM) for storing keying code, nor the mounting of an IC directly to the key shank.

It is a primary object of the invention to provide an electronic door locking system type including a self-contained lock cylinder. A related object is to design a system of this type which is compatible with pre-existing mechanical lock installations, facilitating conversion from mechanical to electronic locks.

Another object of the invention is to design a reliable locking system. Such system should avoid failures due to a variety of physical conditions, such as mechanical stresses, poor electronic connections, and electrostatic discharges Desirably such system should be a purely electronic one, i.e. not dependent on mechanical bitting or the key to open the lock cylinder.

Still another object is to provide the ability to electronically transfer information from the key to the cylinder, and from the cylinder to the key. A related object is to permit recoding of the cylinder by the key, and vice versa. Such a system should be versatile in operation, allowing multilevel master keying and a variety of other significant keying functions.

SUMMARY OF THE INVENTION

The above and additional objects are successfully realized in the locking system of the invention, which is characterized by the encoding of keying codes in non-volatile, electrically alterable memory elements housed in a key and in a lock cylinder. Recognition by the lock cylinder's logic circuitry of a suitable code from the key memory actuates a release mechanism, which withdraws a locking pin from the cylinder plug and permits rotation of the cylinder plug by the key. In the preferred embodiment, turning the cylinder plug by the key then opens the lock through conventional mechanical action. The lock cylinder and key both carry reprogrammable integrated circuit (IC) memory elements, such as EEPROM IC's, which store keying system codes subject to bidirectional read/write communication. The key and cylinder designs permit the miniaturization of components to provide a self-contained electronic cylinder and key—i.e. requiring no external power source, control system hookup, or other hard-wired connections.

A principal aspect of the invention is the electromechanical relationship between the key and the lock cylinder. The system relies on a purely electronic "bitting" of the key to determine whether or not to permit turning of the cylinder plug; i.e. no mechanical bitting of the key other than possibly a bit used for plug centering and key retention. In the preferred embodiment, information is exchanged between key and cylinder via ohmic contacts in both structures. A variety of integrated circuit packaging and mounting arrangements are disclosed which are compatible with the design of a key closely resembling that used with a conventional mechanical lock cylinder. Such constructions preferably house the IC package within a cavity in the key blade.

Yet another aspect of the invention is the protection of sensitive electronic components within the lock cylinder from damage or disruption due to electrostatic discharges (ESD). The cylinder and key designs reduce the susceptibility to ESD, in such aspects as connector placement, protective circuitry within the key and cylinder electronics, packaging and mounting of key electronics, and capacitive coupling of integrated circuits to the cylinder.

Still another feature of the invention is the nature of the release mechanism—i.e. the device which controls the ability of the key to rotate the cylinder plug. As its basic elements, this mechanism includes an electronically driven actuator which controls the position of a locking member (preferably, a locking pin) which selectively engages the cylinder plug. This device translates relatively small amounts of electrical energy into the physical force required to extend and retract one or more radially oriented locking pins from the cylinder plug. This device may include a primary locking pin directly acted upon by the actuator; this primary locking pin when extended resists the force of attempted forced entry, and when withdrawn permits rotation of the plug. Alternatively, the release mechanism may combine an electromechanically actuated latching member with a separate locking pin. An additional pin may be included for key centering and retention.

The electronic locking system of the present invention provides powerful, flexible "keying system" capabilities—i.e. access control functions. Key and cylinder access codes may be associated with a broad range of keying system features. The ability to read and write in both directions provides additional capabilities which may be achieved through suitable software control and keying system management.

BRIEF DESCRIPTION OF THE DRAWINGS

The above and additional aspects of the invention are illustrated in the following detailed description of the preferred embodiment, which should be taken in conjunction with the drawings in which.

DETAILED DESCRIPTION

Figure 1:
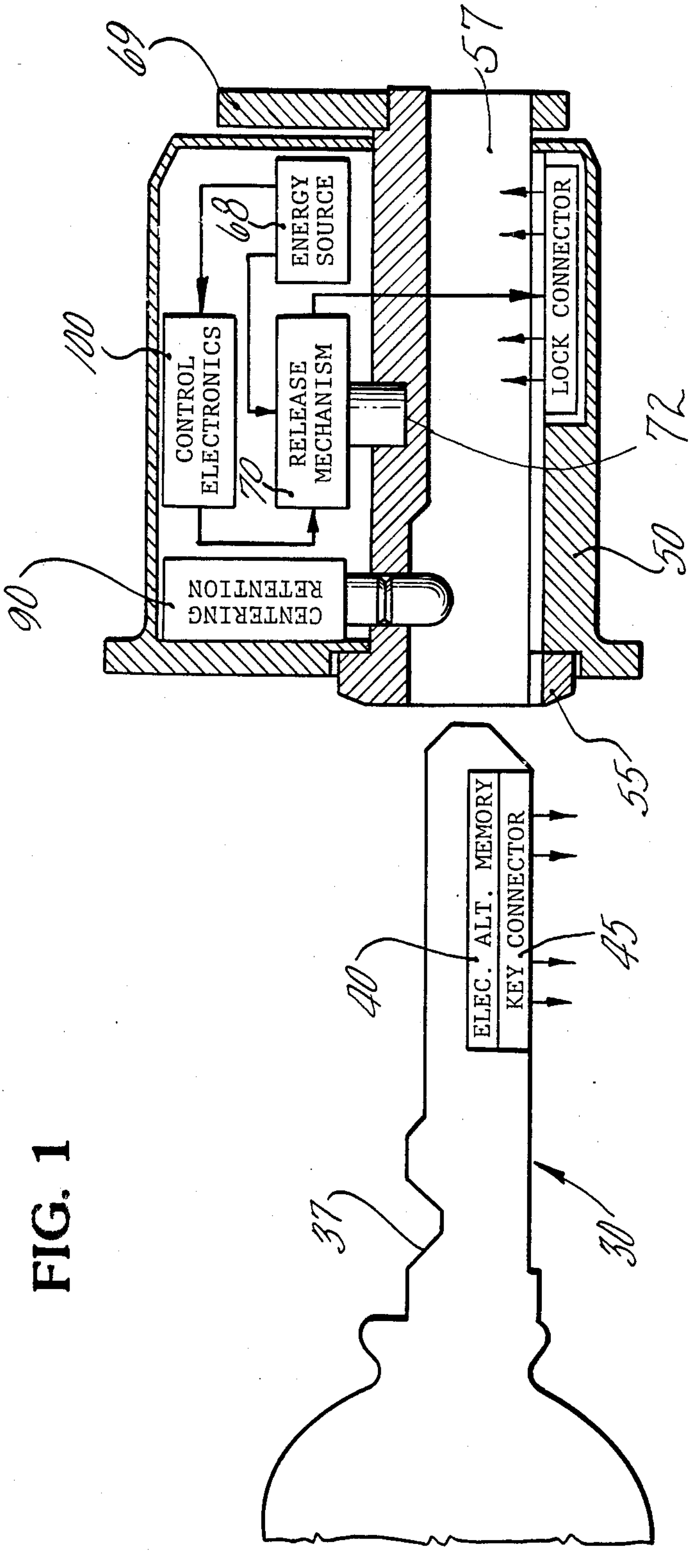
FIG. 1 is a schematic drawing of the electronic locking system of the invention.

One should now refer to FIGS. 1-4 for a general overview of an electric locking system 10 according to a preferred embodiment of the invention. FIG. 1 shows highly schematically the principal elements of locking system 10, in which a key 30 is inserted into mortise lock cylinder 50 to open the lock. Electronic logic circuitry 100 within cylinder 50 recognizes the full insertion of key 30, and extracts electronically encoded information from the key memory 40 via key connectors 45 and lock connectors 59. Control electronics 100 stores and processes keying codes received from key memory 40 as well as resident cylinder codes. The logic circuitry 100 can alter the codes in key memory 40 based on data transmitted from cylinder 50, and can alter codes stored within the cylinder based on data from key memory 40.

The processing of access codes from the key and cylinder by cylinder electronics 100 results in a decision to grant or deny access. If an "authorized access" decision is made, release assembly 70 receives a drive signal from control electronics 100, causing it to withdraw a radially oriented locking pin 72 from cylinder plug 55. A user may then turn key 30 to rotate cylinder plug 55 as in a mechanical mortise lock, and rotate a cam (not shown) to release a door locking mechanism. Although locking system 10 is described in the context of a mortise lock, any compatible mechanical system may be employed. Optionally, cylinder 50 also houses a key centering and retention device 90, which interacts with a single bit 37 or notch in the key to ensure the proper location of key 30 within keyway 57.

CYLINDER OVERVIEW

Figure 3:
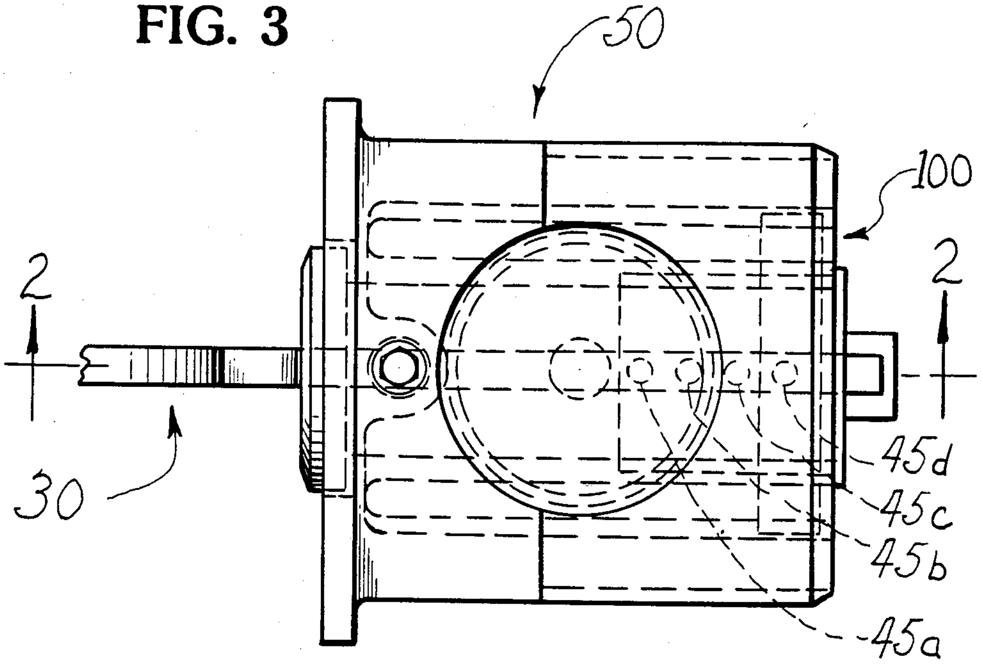
FIG. 3 is a plan view of the lock cylinder of FIG. 2.
Figure 2:
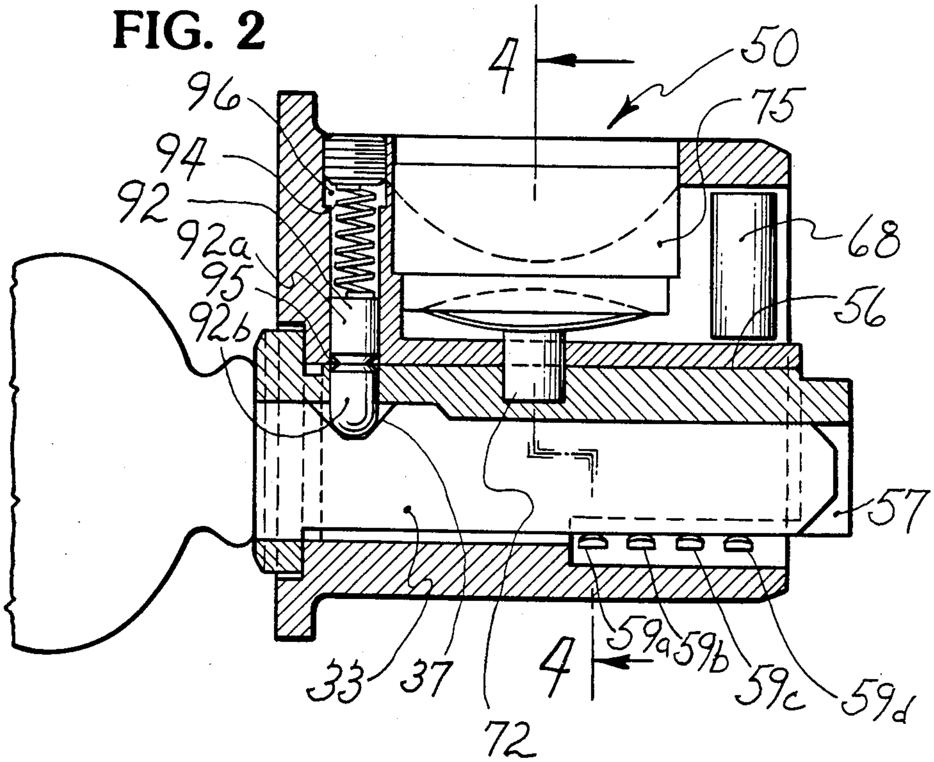
FIG. 2 is a sectional view of a lock cylinder in accordance with the preferred embodiment, taken along the plane of a fully inserted key (section 2—2 of FIG. 3)
Figure 4:
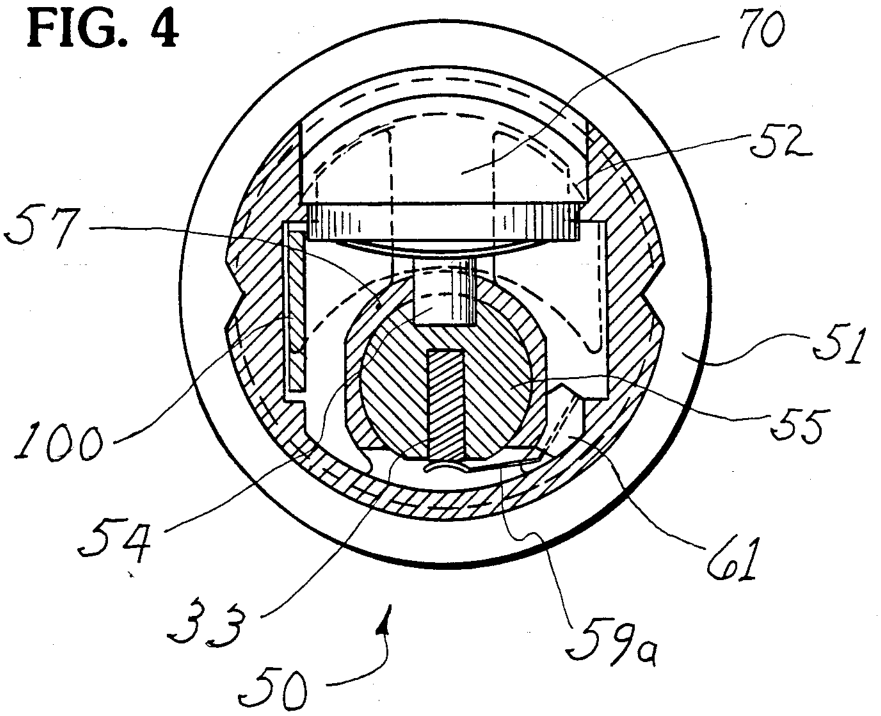
FIG. 4 is a sectional view of the lock cylinder of FIG. 2, taken along the section 4—4.

FIGS. 2-4 show in various views a preferred design for lock cylinder 50, with a fully inserted key 30. The sectional view of FIG. 2 shows key blade 33 of key 30 inserted in the keyway 57 of plug 55. Centering/retention pin 92, biased by spring 94, fits within a notch 37 along the upper edge of the key 30 the interface 95 between pin segments **92*a* and 92*b*. Pin 92 is comprised of discrete upper and lower segments 92*a*, 92*b*. Pin 92 prevents the withdrawal of key 30 except when in its illustrated, "home" position, at which point the rear camming surface of notch 37 exerts an upward force during key withdrawal. When pin 92 is in its extended position, the interface 95 between pin segments 92*a* and 92*b* is aligned with the cylinder-plug shear line 56, to permit plug rotation. With key 30 in its home position, ohmic contacts 45*a*-45*d* (FIG. 3) abut against cylinder contacts 59*a*-59*d*, which are in this embodiment placed along the lower edge of key 30 for reasons of spatial economy. (Cf. FIG. 4**).

Having reference to both FIGS. 3 and 4, the illustrated, self-contained configuration of lock cylinder 50 includes an upper cavity 52 to house the release assembly 70, power supply 68, and cylinder electronics 100. Key centering/retention assembly 90 is shown housed in a separate chamber 96. This packaging of components is compatible with the form factor of a standard U.S. 1⅛" mortise cylinder, thus permitting the retrofitting of electronic cylinders 50 in conventional lock installations.

As seen in FIG. 4, release assembly 70 must fit within a limited volume. Its pin 72 must have requisite size and mass, and firmly engage cylinder plug 55, to resist the torque of an attempted forced entry. That portion of cylinder shell 51 housing the locking pin 72 should include adequate bearing material for the operation of mechanism 70. When release motor 75 is actuated to allow access, it retracts pin 72 which moves clear of the shear line 56 (FIG. 2) to allow plug 55 to rotate.

Figure 12:
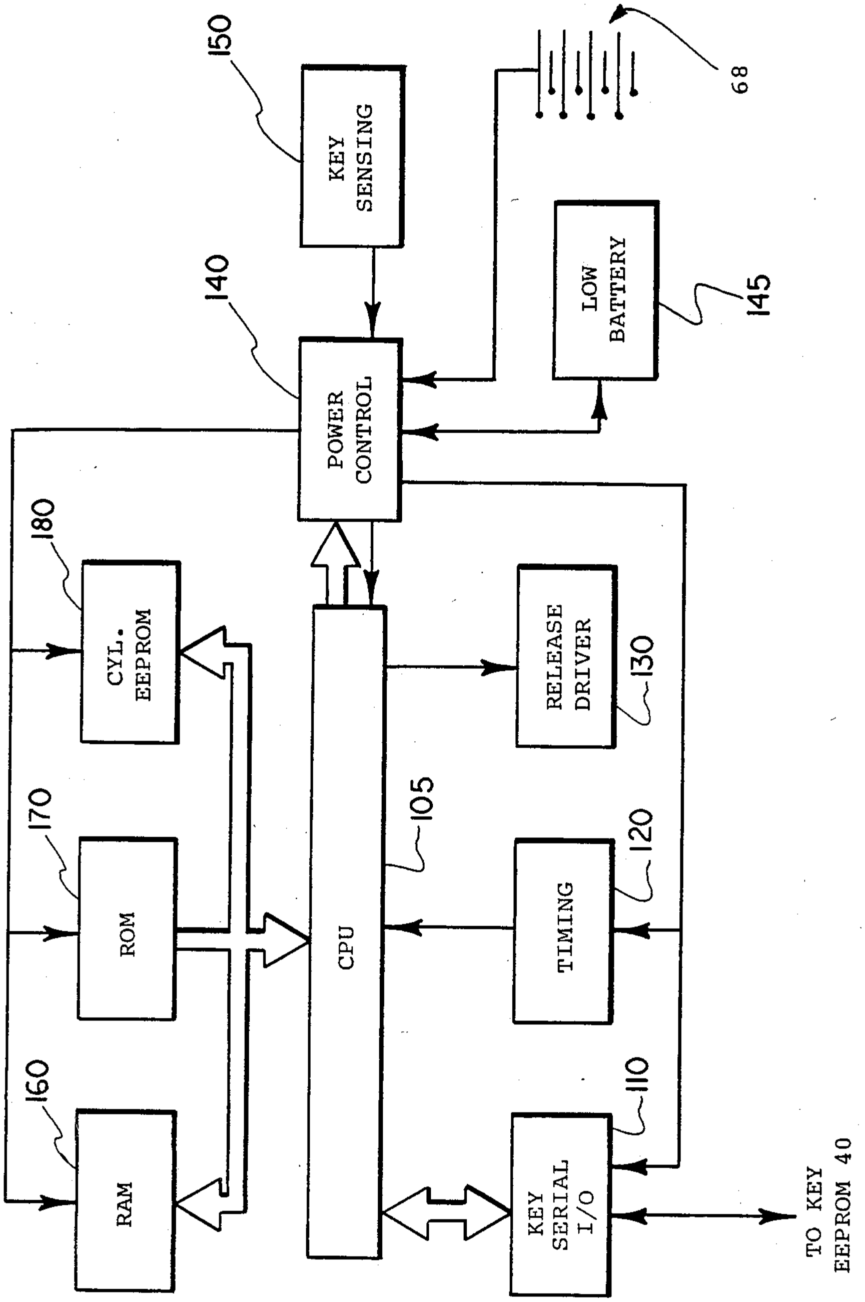
FIG. 12 is a block schematic diagram of electronic logic circuitry for the lock cylinder of FIG. 1.

Power supply 68 provides sufficient peak current and power to power the release mechanism driver circuitry 110 (FIG. 12). Although a variety of self-generating power sources and battery technologies may be employed, excellent results have been obtained using lithium thionyl chloride batteries. In an alternative embodiment, not illustrated in the drawings, the cylinder electronics and power supply are packaged externally to the cylinder in a separate module. This approach allows more flexibility in packaging the remaining cylinder components, and facilitates the adaptation of the invention to a standard 1⅛" mortise cylinder.

RELEASE MECHANISM

Figure 5:
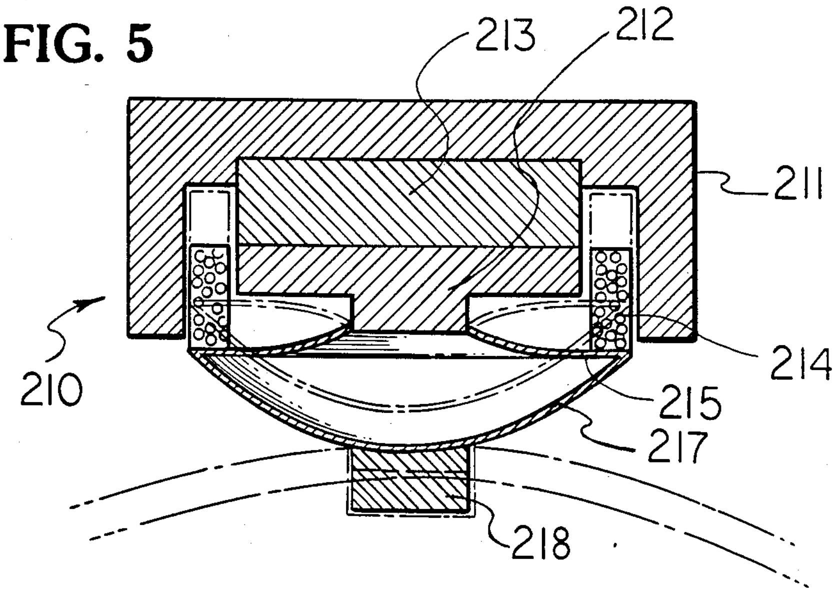
FIG. 5 is a sectional view of a preferred electromagnetic actuator, acting as a primary release mechanism for the locking system of FIG. 1.
Figure 6A:
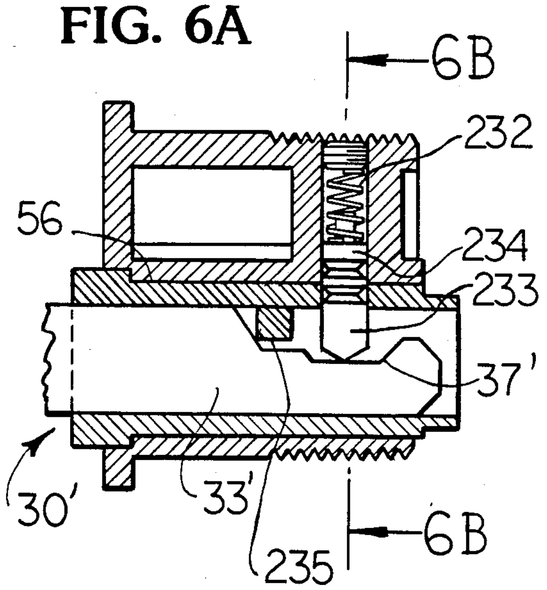
FIG. 6A is a sectional view of a secondary release mechanism employing the actuator of FIG. 5, taken along the plane of a fully inserted key.
Figure 6B:
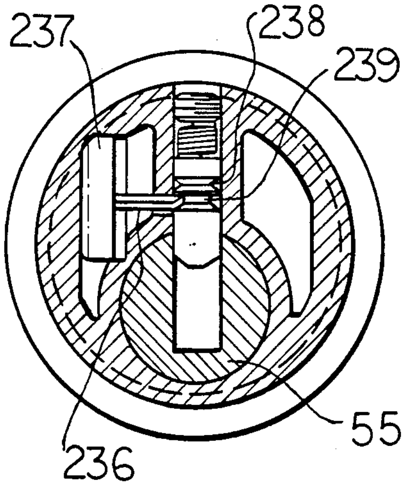
FIG. 6B is a sectional view of the secondary release mechanism of FIG. 6A, in a section taken along the lines 6B—6B.
Figure 7:
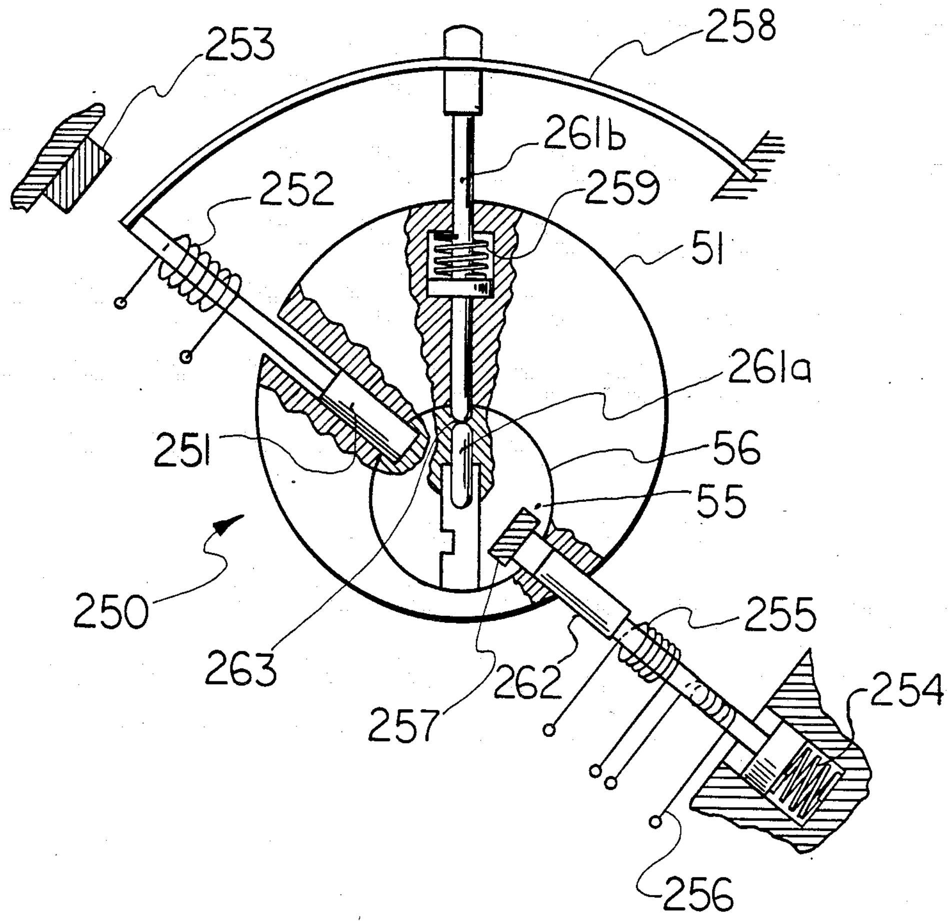
FIG. 7 is a sectional view of an alternative electromagnetic release mechanism.

FIG. 5–7 show various designs for the release assembly 70, the device which prevents rotation of plug 55 until the control logic 100 commands it to allow access (permit plug rotation). Release assembly 70 is designed to translate limited amounts of electrical energy into the physical force required to move radially oriented locking pin 72. FIG. 5 illustrates an advantageous design 210 for the release mechanism motor 75 of FIGS. 2–4. Release actuator 210 includes a permanent magnet 213 with pole pieces 211, 212, whose field acts on a bobbinless voice coil 214. Coil 214 is attached to a two layer disc spring, comprised of a bistable snapover spring 215, and outer, deflection spring 217. Snap spring 215 is affixed to the central pole piece 212 at its center and to voice coil 214 at its perimeter, and locates voice coil 214 in the center of the gap between pole pieces 211, 212. Deflection spring 217 is joined to snap spring 215 at its periphery, and is firmly affixed at its center to locking pin 218.

In operation, when locking pin 218 is in its outward, locking position, it is necessary in order to retract the pin to provide current through coil 214 to generate a field of opposite polarity to that of permanent magnet 211, of sufficient strength to overcome the snap action of bistable spring 215. If pin 218 is free to move, deflection spring 217 will pull the pin toward magnet 211. If pin 218 is jammed, spring 217 will deflect in order to permit spring 215 to toggle; when the pin is freed, deflection spring 217 will then pull pin 218 toward magnet 211.

When current of opposite polarity is applied, coil 214 will move away from magnet 211, and toggle spring 215 will snap to its outward position. Again, if pin 218 is constrained, the deflection spring 217 will allow the motion of coil 214 and apply an outward force on the pin until it is free to move.

In the preferred application of magnetic actuator 210, this device is used as a "primary release mechanism"—i.e. pin 218 serves as the locking pin 72 (FIGS. 2–4). When key 30 is inserted in keyway 57 and a valid code is recognized by the lock electronics 100, assembly 210 will apply a retraction force to pin 72. If the key is applying a torque to the plug 55, pin 72 will not move until the torque is removed by jiggling the key. The pin will then move toward magnet 211 allowing plug 55 to rotate. When the key rotations have been completed, key 30 is returned to its home position to be withdrawn from cylinder 50. A sensor (not shown) detects the withdrawal motion of the key, and sends a signal to motor 75 to push the locking pin back into plug hole 54. Assembly 90 ensures that key 30 can be removed only when pin 72 is aligned over the plug hole 54.

In an alternative embodiment of the invention, illustrated in FIGS. 6A and 6B, the magnetic actuator device of FIG. 5 is combined with a separate locking pin to achieve a release mechanism that also provides the key withdrawal alignment function—a "secondary" release assembly. FIG. 6A shows release assembly 230 in its unlocked configuration, seen along the plane of fully inserted key blade 33', The separate locking pin assembly 231 includes a blocking pin 234, locking pin 233 and compression spring 232; pins 233 and 234 meet at an indented interface 238, while locking pin 233 includes a circumferential groove 239. As seen in the transverse sectional view of FIG. 6B, the release mechanism incorporates a magnetic motor 237 such as that of FIG. 5, which reciprocates a sear tongue 236.

Before a key 30' is inserted locking pin assembly 231 is held in an upward position by the insertion of sear tongue 236 into groove 239, as shown in FIG. 6B. Upon an "allow access" decision by the key electronics after the full insertion of an authorized key (FIG. 6A), motor 237 is activated pulling sear tongue 236 free of the locking pin 233. Drive spring 232 pushes the pins 233, 234 downwardly until the locking pin 233 seats in cylinder plug 55 against the notch 37' in key blade 33'. At this position, the interface 238 between pins 233 and 234 lines up with shear line 56 allowing the plug 55 to rotate. While pin assembly 231 is extended, the mating between locking pin 233 and key notch 37' prevents key 30' from being withdrawn. If plug 55 is properly aligned with key 30' in its home position, the key can be removed urging pin 233 upwardly due to the key's ramp profile. During key withdrawal, motor 237 is actuated in the opposite polarity to push sear tongue 236 against pin assembly 231. When key blade 33' pushes pins 233, 234 to the proper height, sear tongue 236 enters groove 239 preventing further movement.

The blocking pin 234 abuts against the cylinder shell to prevent the forcing of pin assembly 231 upwardly beyond the shear line. Pin 235 resists tampering with pin assembly 231 using a drill or like device.

FIG. 7 illustrates a further electromagnetic release mechanism 250. This assembly is designed to protect against manipulation using an external magnetic field, as well as against forced entry by vibration, using a sharp impact against the lock cylinder housing, etc. Furthermore, assembly 250 requires very little energy in operation, thereby prolonging the intervals between battery replacements.

As seen in FIG. 7, release assembly 250 consists of two locking pins 251 and 262, solenoids 252 and 255, permanent magnets 253 and 257, flat spring (clock spring) 258, spring loaded pin 261 (comprised of parts 261*a*, 261*b*), a winding 256 on the lower locking pin 262, and a spring 254. When spring loaded pin 261*b* has fully engaged cylinder plug 55, it is mechanically constrained in its locked position by spring 259, which is coupled to pin 261*b*. Clock spring 258 constrains locking pin 251 in its locked position. Upon insertion of a properly bitted key, spring loaded pin 261*b* is ramped up, thereby aligning the gap 263 between pins 261*a*, 261*b* with the shear line 56. This urges clock spring 258 upwardly and removes the mechanical restraint on locking pin 251, which is now free to move up to its unlocked position. If the cylinder logic recognizes a valid, key, solenoid 252 is energized, pulling locking pin 251 against permanent magnet 253. Plug 55 is thereby unlocked and free to rotate. Upon removal of key 30 from the keyway, spring loaded pin 261 returns to its fully depressed position, blocking the shear line 56 and unloading flat spring 258. Spring 258 in turn pushes locking pin 251 into a locked position.

A second, coaxial solenoid-actuated locking pin 262 is incorporated into release assembly 250 to protect against unauthorized opening of the lock while using a key blank to ramp up the spring loaded pin 261. If an external force is applied to the locking cylinder envelope to attempt to move locking pin 251 up against permanent magnet 253, lower locking pin 262 will simultaneously move upward under the action of spring 254. Pin 262 will thereby move against permanent magnet 257 into its locked position and prevent rotation of plug 55. Upon subsequent insertion of a valid key, a slight momentary current through solenoid winding 255 induces a voltage differential in the output terminals in winding 256. The resulting voltage differential will be processed by the cylinder electronics 100 to energize solenoid 255, pulling locking pin 262 back and allowing plug 55 to rotate freely. Solenoid 255 is thus energized only in the event that locking pin 262 has been moved upwardly into its locked position, thereby changing the relative position of windings 255 and 256.

An alternative version of the solenoid release assembly of FIG. 7 omits the lower locking assembly and replaces the conventional solenoid 252 and permanent magnet 253 with a bistable solenoid assembly. Such bistable solenoid assembly will exhibit a toggle characteristic when energized; in either of its two positions, it will be much less susceptible to external magnetic fields, sharp impacts to the lock envelope, etc.

In the release assembly of FIG. 7 the flat spring 258 and spring loaded pin 261 serve as a bistate mechanical assembly which acts in cooperation with the solenoid-locking pin components. Such assembly mechanically restrains the locking pin in its locked position when the release mechanism is in its locked configuration; is moved to a second state by the key during insertion of the latter, thereby providing a clearance region for the locking pin so that the latter may be moved to its unlocked position by the solenoid; and upon removal of the key reverts to its first configuration due to a mechanical bias, thereby forcing locking pin 251 into its locked position.

Figure 17:
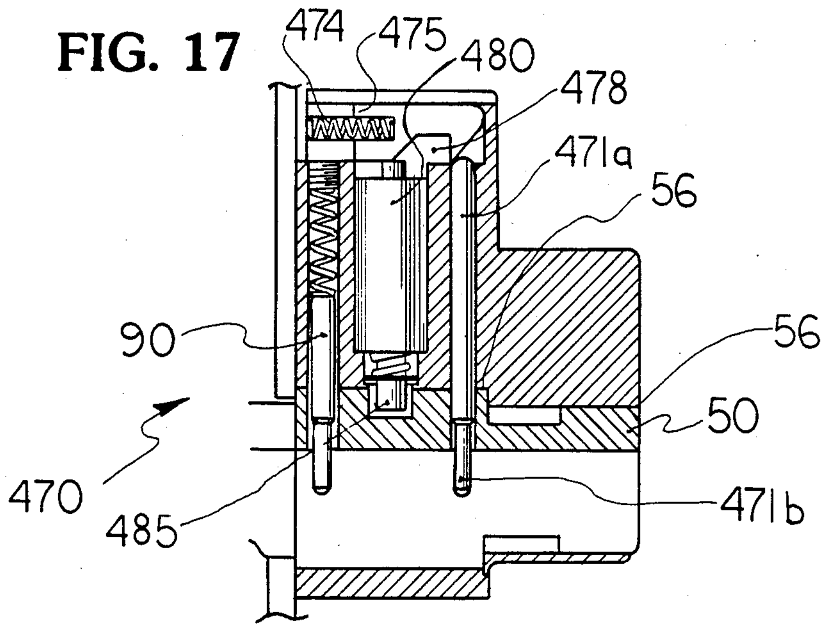
FIG. 17 is a sectional view of a release assembly in accordance with a further embodiment of the invention, in its locked configuration.
Figure 18:
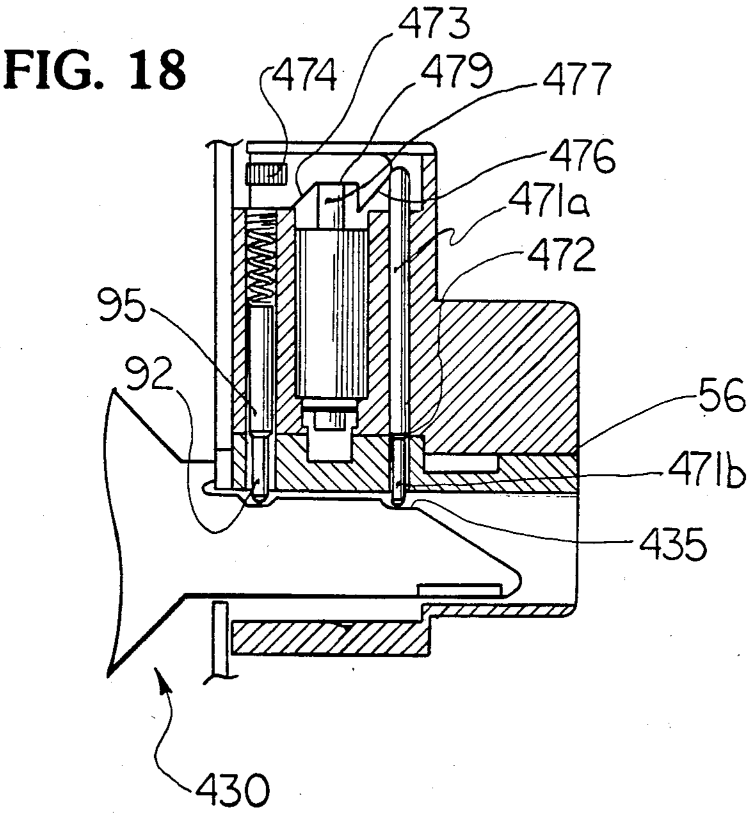
FIG. 18 is a sectional view of the release mechanism of FIG. 17, with key inserted and solenoid enabled.

FIGS. 17 and 18 illustrate a further release assembly 470 incorporating a bistable mechanical assembly having the functional characteristics discussed above. Release assembly 470 includes a solenoid 480 which is radially aligned relative to the keyway, the solenoid plunger being coupled to locking pin 485 which when extended prevents rotation of the cylinder plug 50. When release assembly 470 is in its locked configuration, locking pin 485 is restrained in its extended position by cam member 475, and a further pins 471*a* and 471*b* are also held down by cam member 475. Absent a countervailing force the cam member 475 is biased in this position by compression spring 474. Upon insertion of a key 430, the pins 471*a*, 471*b* are ramped up until they rest against the key ledge 435, at which point the gap 472 is aligned with the shear line 56; pin 471*a* displaces cam member 475 via ramp surface 476, providing a clearance region 478 for the end 477 of locking pin 485. At this point, if solenoid 480 is actuated the locking pin 485 can retract from cylinder plug 50; magnet 479 latches the pin 485 in this retracted position so that the solenoid need not be constantly powered or pulsed to maintain this configuration. Upon removal of the key, compression spring 474 drives cam member 475 to its original position, thereby camming down locking pin 485 and pins 471*a*, 471*b*.

In the embodiment of FIGS. 17 and 18, centering/retention assembly 90 has like structures and functions to that of FIGS. 2-4.

KEY WITH IC

Figure 8:
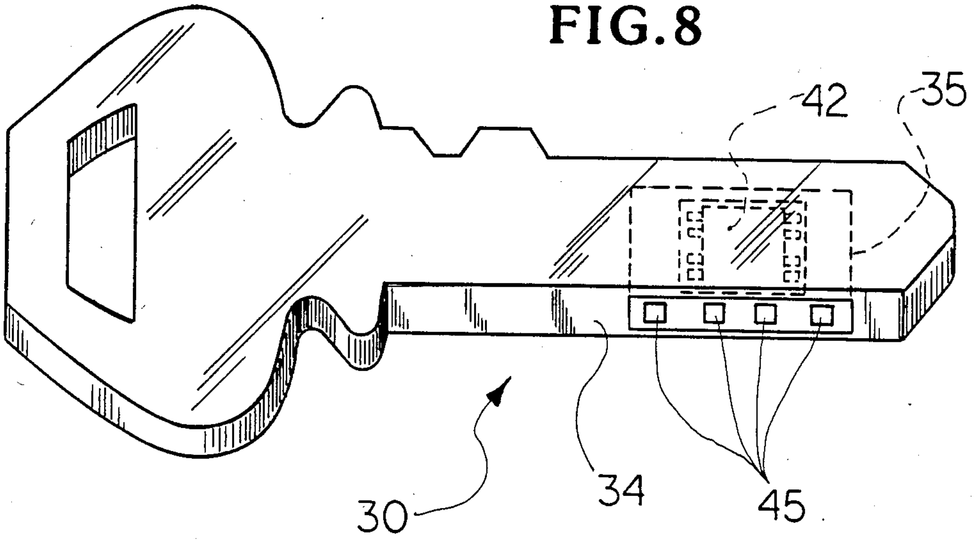
FIG. 8 is a perspective view of a preferred design of an IC-bearing key for the locking system of FIG. 1, showing an IC package insert in phantom.

FIGS. 8-11 illustrate various constructions of the key 30. A suitable design for key 30, shown in FIG. 8, is quite similar to that of a conventional mechanical key. The lower edge 34 of the key has no bitting, and has a rectangular slot or cavity 35, which houses integrated circuit package 42 (shown in phantom) and,key contacts 45. Contacts 44 are located flush with the lower key edge 34.

Figure 9:
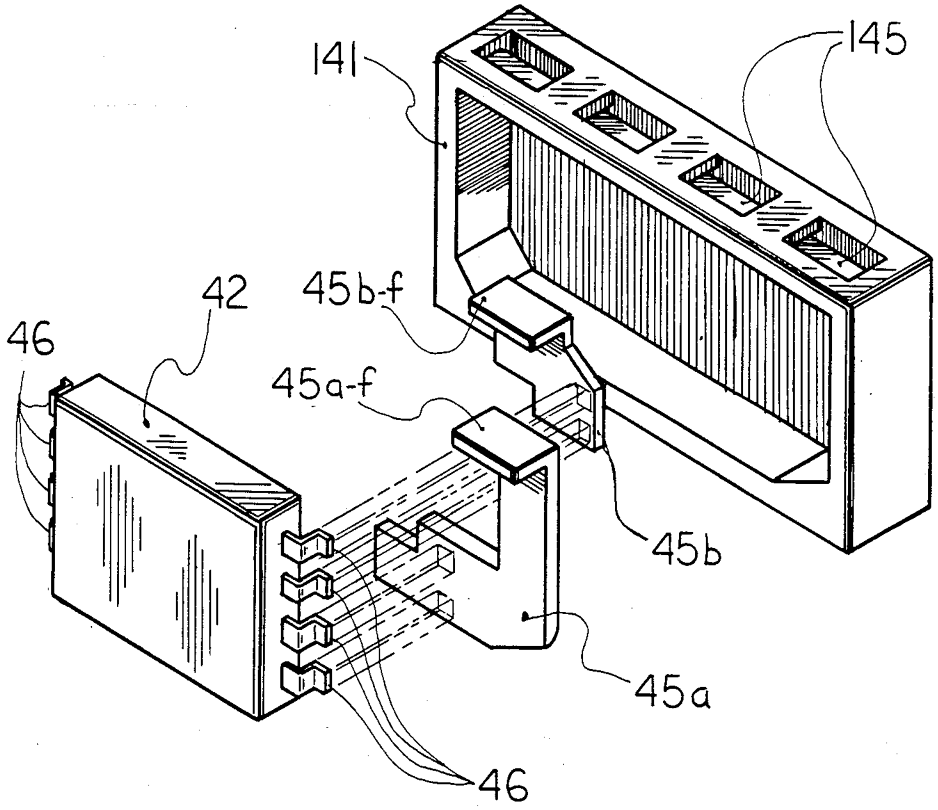
FIG. 9 is an exploded view of the IC package insert of FIG. 8.

The embodiment of FIGS. 8 and 9 utilizes a surface mounting technique, wherein the integrated circuit 41 is mounting in a compact surface mount package 42 having adequate size and pin outs for the electrically alterable ICs 41 within each package. Surface mount package 42 is retained within a rectangular insert 141, shown in phantom in FIG. 8, which is closely fitted within a complementary cavity in the bottom edge 34 of key 30. The IC package 42 electrically communicates with a set of four contacts 45*a*–45*d* which are mounted flush with the outer wall of insert 141 as well as within key edge 34. FIG. 9 shows in an exploded view the various elements of the IC package insert 141 (only two contacts 45 are shown). The surface mount package 42 comprises a standard S08 dual in-line package, including 8 pin-outs 46. Appropriately shaped contacts 45 are embedded in insert 141 and include flange portions 45*a–f*, 45*b–f*, etc. which fit within apertures 145 in rectangular insert 141, to provide flush contacts. In an operative embodiment of surface-mounted IC package 42, mounting insert 141 was a filled nylon substrate in accordance with FIG. 9, with four imbedded noble metal alloy contacts 45*a*–45*d*. Insert 141 was press fitted into a rectangular slot cut in the bottom edge 34 of key 30.

Figure 11:
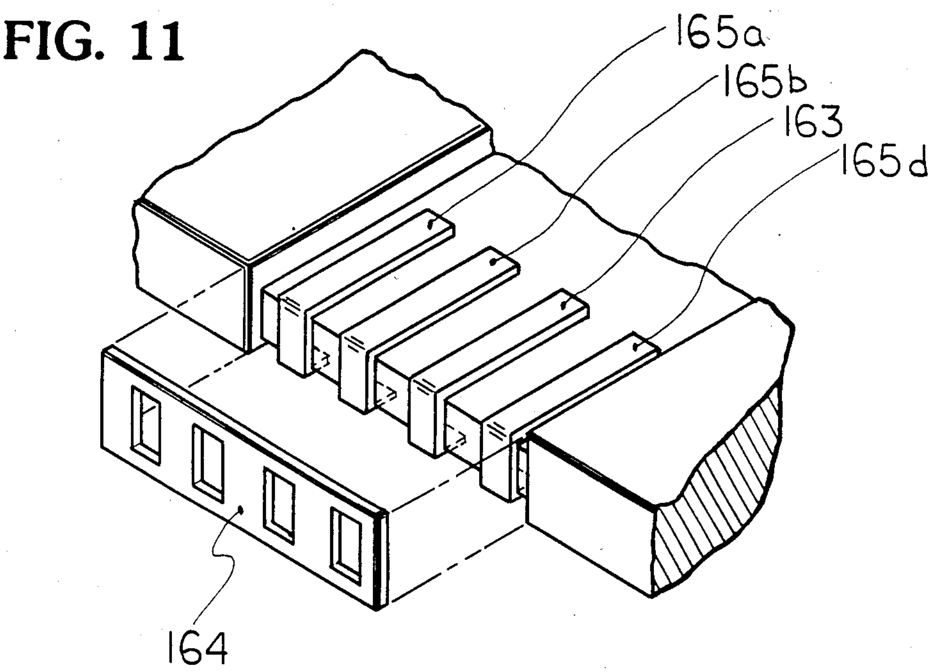
FIG. 11 is a diagrammatic view of the integrated circuit mounting area of the key blade of FIG. 10.
Figure 10:
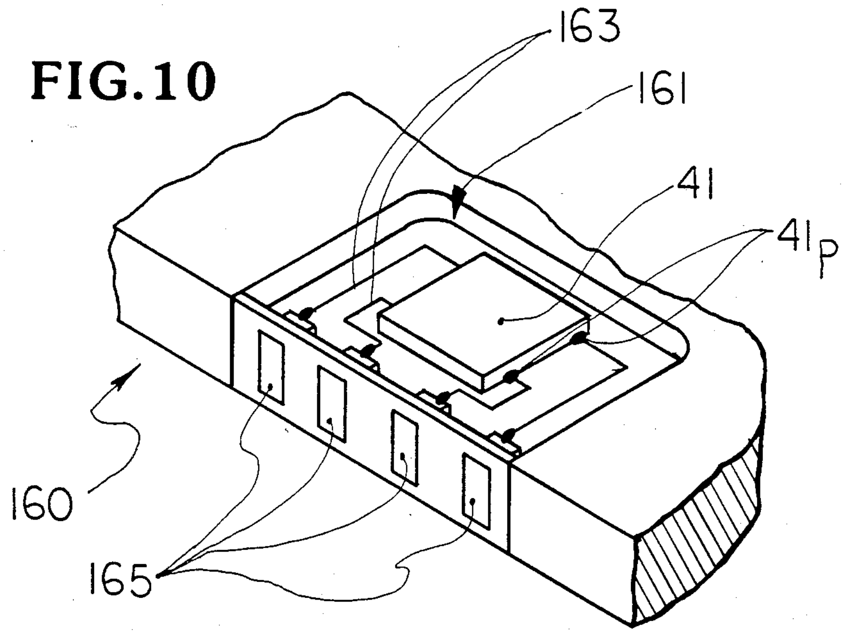
FIG. 10 is a fragmentary view of the key blade of an alternative key design in accordance with the invention.

The alternative IC mounting embodiment of FIG. 10 and 11 uses a "chip and wire" mounting technique. The integrated circuit die 41 is inserted into a cavity 161 which was milled or coined into one face of key 160 Cavity 161 has previously had a layer of insulating ceramic fired on to create a dielectric layer over the metal body of the key. The integrated circuit's pads 41*p* were electrically coupled by conductors 163 to key contacts 165 using well known porcelain-over-metal thick film hybrid techniques. Contacts 165*a–d* comprised noble metal alloy clips which were clipped or bonded to conductors 163, and anchored at an indented region of the opposite face of key 160. Contacts 165 were electrically isolated from the metallic body of key 160 by plate or potting 164, and all required components were encapsulated with a conventional potting material to hermetically seal the integrated circuit 41.

OHMIC CONTACTS

In all of the embodiments of FIGS. 8–11 ICs 41 are electrically connected to a set of ohmic key contacts 45. Advantageously, contacts 45 are composed of a hard noble metal alloy which allow adequate contact pressure to force contact through dirt or film by a wiping action, and which withstands corrosion under typical environmental conditions. Excellent results have been observed with Paliney noble metal alloys (Paliney is a registered trademark of J. M. NEY Company). In a particular embodiment of the invention, key contacts 45 were formulated of Paliney 8 alloy (comprising palladium, silver, and copper) and cylinder contacts 59 of Paliney 7 alloy (comprising the above elements plus gold and platinum).

With further reference to FIGS. 2–4, cylinder contacts 59*a*–59*d* provide firm, reliable ohmic contact with the respective contacts 45*a*–45*d* of a fully inserted key 30. As best seen in FIG. 4, contacts 59 are cantilevered members mounted to a contact holder 61 at one side of cylinder plug 55, with dished tips pressed firmly against the contacts 45 in key 30.

Advantageously, locking system 10 relies on a suitable protocol for data communication between key memory 40 and cylinder logic 100, to ensure accurate data transmission over noisy paths (ohmic contacts 45, 59). Such protocol includes redundant, error-detection data bits in all transmissions. The data receiver, whether key or cylinder, compares the transmitted access code bits and the error-detecting bits to see that these match A number of well known encoding methods allow the detection of errors as well as the correction of simpler errors. Such technique enables error-free data transmission in the face of intermittent contact problems due to dirt, films, premature key withdrawal, and the like. Defective transmissions can be recognized and often reattempted. Significantly, such encoding techniques allow the key or cylinder to avoid writing erroneous data, or writing data to the incorrect location. Preferably, this protocol is implemented both in the cylinder control logic 100 and in I/O circuitry within the electronically alterable memory 40 in key 30.

ELECTRONICALLY ALTERABLE KEY MEMORY

Electronically alterable key memory 40 has the ability to store a substantial number of access codes, each of which will have a much larger range of possible values then found in traditional mechanical locks. This nonvolatile integrated circuit technology involves memory which may be read like traditional read-only-memory (ROM), and may be written to after being electronically erased. Such memory devices are commonly known as EEPROM integrated circuits. EEPROM is a medium density memory, which retains adequate key memory within devices on the order of 2–3 mm micron geometry. To store data in such devices, the word must be erased and then written. Typical erase/write cycles (E/W) are on the order of 20 milliseconds, and require less than 15 milliamperes.

Although a variety of EEPROM process technologies are available, it is desirable to utilize a type which achieves high reliability over an extended service life. Various SNOS (Silicon Nitride Oxide Silicon) and CMOS (Complementary Metal Oxide Semiconductors) process technologies have been developed for the design and production of EEPROM devices of suitable characteristics for key memory 40 and cylinder memory 180 (FIG. 12). EEPROM cells have a normal life expectancy of 10,000 E/W cycles, ater which there will be an increased risk of catastrophic failure. For SNOS process technologies, these failure parameters are related in that data written to a given memory cell on the 10,000th erase/write cycle will be retained for at least ten years, and subsequent erase/write cycles to the same cell will be retained for a somewhat shorter period.

It is important to include in key memory 40 on-board input/output protection against electrostatic discharge (ESD) attack. I/O protection circuits for integrated circuits are well known to persons of ordinary skill in the art. Such protection is critical to the reliability of locking systems according to the present invention.

CYLINDER ELECTRONICS

FIG. 12 is a block schematic diagram of cylinder control logic 100, which supervises the various electronic functions of lock cylinder 50. Control logic 100 is a microprocessor based system including central processing unit (CPU) 105 as its central element. Other major components of cylinder logic 100 are key serial interface 110, which provides synchronous serial communications of access code data to and from the key EEPROM 40; timing circuitry 120, which provides various timing signals for cylinder logic 100; Key Sensing circuitry 150, which produces signals indicative of the full insertion of key 30 in keyway 57, and of the withdrawal of the key; Power Control circuitry 140, which regulates the delivery of power from battery 68 to the various elements of cylinder logic 100; and Release Driver 130, which outputs actuating signals to the release assembly 70 in response to an appropriate command from CPU 105. Optionally, timing circuitry 120 incorporates a real time clock (not shown) to provide real time control over the keying system, as further discussed below. Key serial interface 110 includes appropriate input protection circuitry, which together with control of the capacitive coupling of the logic elements to the cylinder body 50, protects the cylinder electronics 100 from catastrophic high voltage attack due to electrostatic discharge (ESD). Although a variety of key sensors may be suitably employed in combination with sensing logic 150, it is preferred to sense the change in resistance between two normally open cylinder contacts 59. This arrangement draws very little current from power source 68 should key 30 be left in keyway 57 over an extended period.

Cylinder logic 100 also encompasses various types of memory, including random access memory (RAM) 160, read only memory (ROM) 170, and electronically alterable memory (EEPROM) 180. RAM 160 receives data from key interface 110 and permits high speed processing of this data by CPU 105. ROM 170 stores the firmware for the cylinder control logic; certain routines are explained below in the discussion of the lock's keying system. EEPROM 180 comprises nonvolatile memory for the access codes resident in cylinder 50, and may take the form of any of a number of energy-efficient commercially-available devices.

A significant design characteristic of control logic 100 is its low power consumption. Under the supervision of Power Control assembly 140, the control logic 100 undergoes various states of power distribution to the various subassemblies. Until Key Sensing logic 150 signals the full insertion of key 30, this assembly 150 is the only one which receives power. When a key is recognized as present, sensing logic 150 directs power to CPU 105 and other components involved in the decision to permit or deny access. When this decision has been made, Power Control assembly 140 turns off all but the Release Driver 130 (if required) and the Key Sensing logic 150 (which is on at all times). Low Battery assembly 145 detects a low power state of battery 68 and may provide an external indication (as by lighting an LED) as well as a signal to CPU In one embodiment of the invention, timing assembly 120 includes a real time clock to provide a time-of-day signal—i.e., a resolution of some number of minutes. Illustratively, this clock takes the form of a dedicated clock IC. The energy source 68 (FIG. 1) is designed to provide continuous input power to this clock IC. The inclusion of a time of day clock significantly affects the access code memory structure, and keying system firmware, as discussed below.

The preferred construction of cylinder electronics 100 utilizes thick film hybrid technology, including a single board cylinder controller which houses the CPU 105, RAM 160, ROM 170, and various other elements largely expressed in "standard cell logic". This circuit comprises a miniature ceramics substrate, with either small surface mount IC packages, or chip-in-wire mountings. Certain high voltage or higher powered components are preferably built of discrete components, such as discrete transistors which switch the high current pulses produced by the Release Driver 130.

Figure 13:
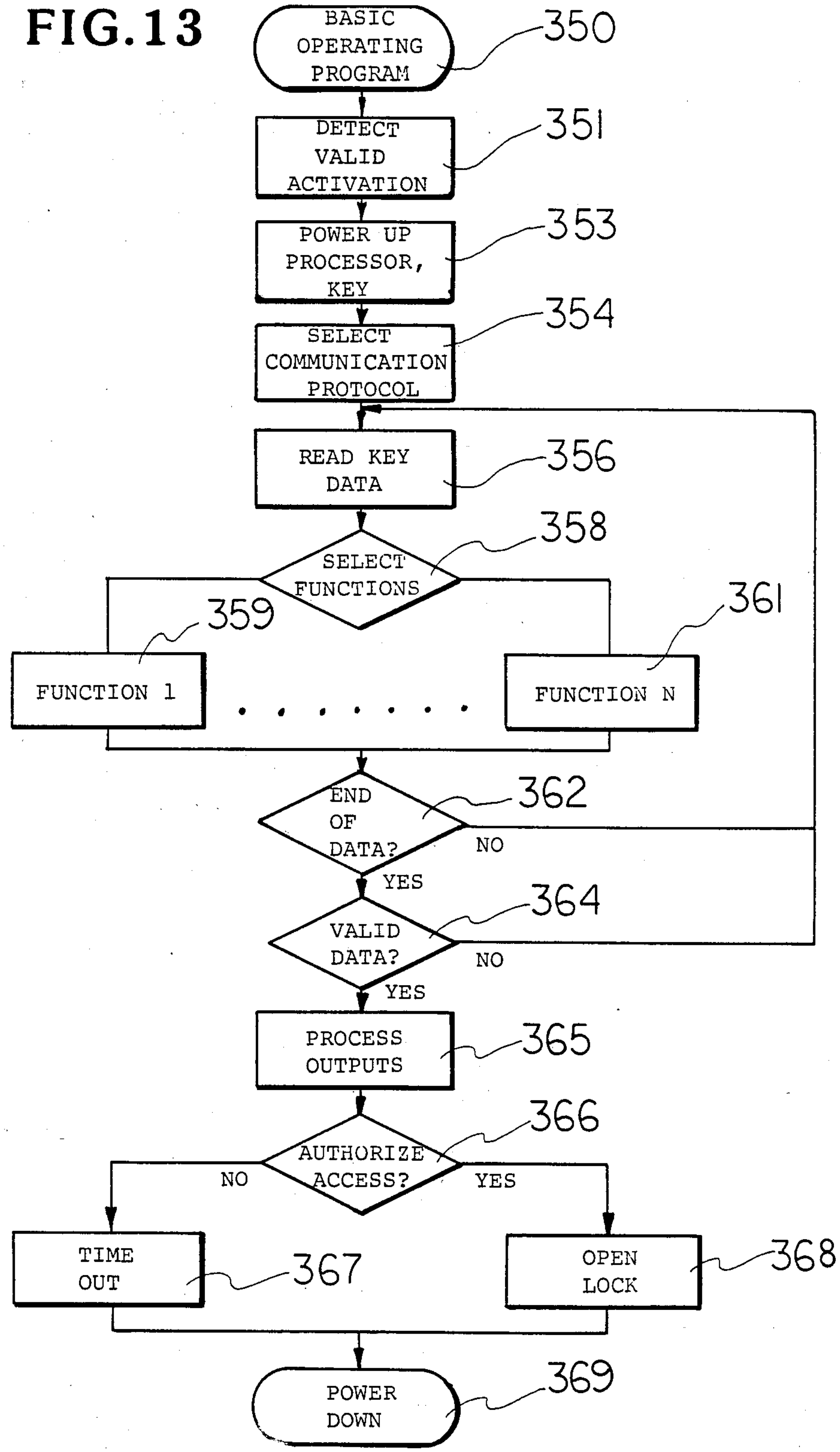
FIG. 13 is a flow chart schematic diagram of a basic operating program for the electronic logic of FIG. 12.
Figure 15:
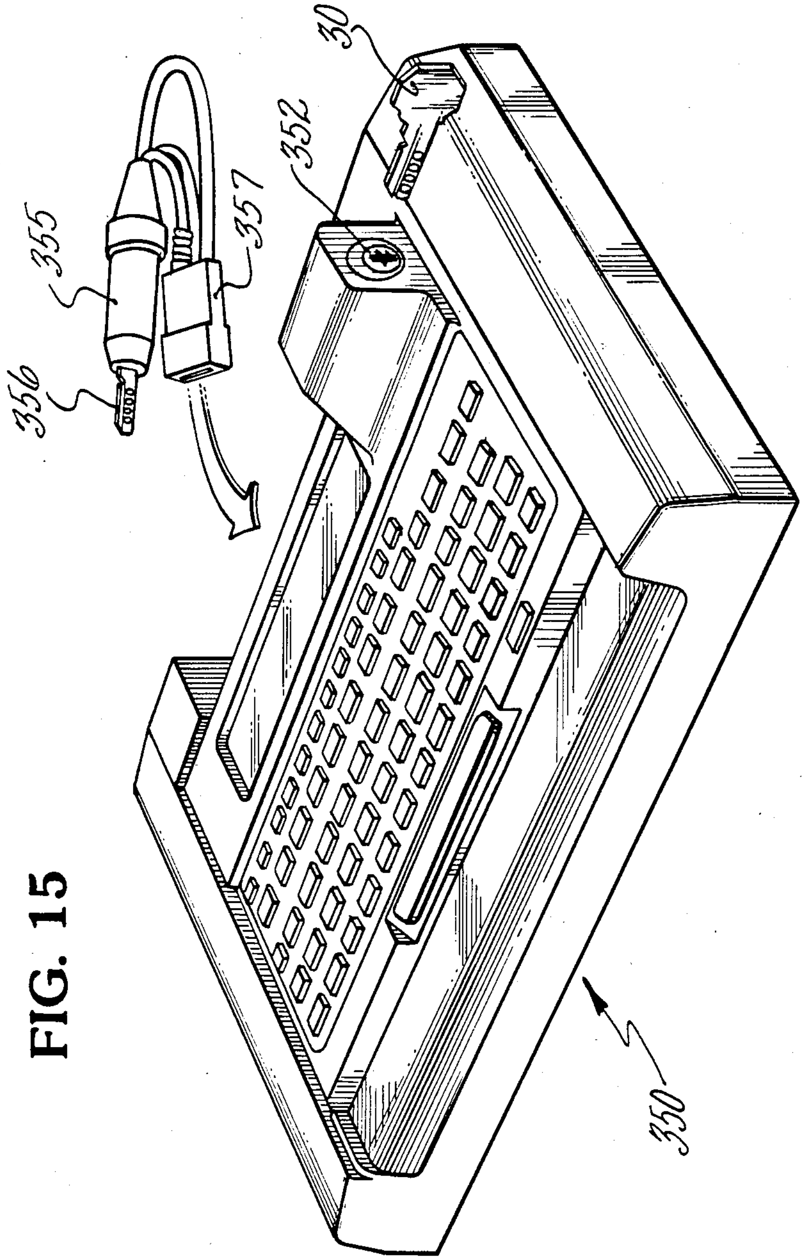
FIG. 15 is a perspective view of an advantageous design of key/cylinder recombination console.

FIG. 13 is a high-level flowchart schematic diagram of the basic operating program 850 for cylinder logic 100, which is resident in ROM 170 (FIG. 12). At 851 the Key Sensing assembly 150 detects the valid insertion of a key, causing Power Control 140 to provide power to CPU 105 and key 30, at 853. At 854, the logic selects a suitable communication protocol for Key Serial I/O 110 (FIG. 12); different protocols would typically be required for normal key 30 and for the cylinder recombinating device 355 (shown in FIG. 15, and discussed below at "Management System"). At 856 the Key Serial I/O reads data from the key memory 40 into RAM 160.

As further explained below under "Keying System", the key and cylinder memories are structured in the preferred embodiment in a plurality of keying functions F1, F2 . . . FN. In the illustrated program data is read from the key at 856 on a function-by-function basis. At the case block comprised of step 858 and steps 859 . . . 861, 862, and 864 the program selects the appropriate function subprogram stored in ROM 170 and interprets the just-read key codes. Depending on the nature of the particular subprogram, this interpretation process may result in an "authorize access" decision; may yield data which is intended to be delivered to the key or key-like device (such as for recombinating a key 30 or for providing information about cylinder 50 to a clerk console 350); and may result in commands to recode the cylinder memory 180. Cylinder recoding, if required, advantageously takes place at this stage. At 862, the CPU tests the key data in RAM 160 to determine whether an "end of data" flag is present, while at 864 the redundant check codes in the key data are analyzed to confirm that valid key data had been received. A failure of the latter test causes the re-reading of the invalid key data.

TABLE 1

| DOOR UNIT MEMORY MAP | |
|---|---|
| FIXED FORMAT | DOOR UNIT ID |
| | PROGRAMMING CODE |
| | MESSAGE STORAGE |
| | STATUS |
| VARIABLE FORMAT | FUNCTION STORAGE |

TABLE 2

| ZONE FUNCTION MEMORY MAP | | | | | |
|---|---|---|---|---|---|
| NUMBER OF RECORDS | | | | | |
| CODE COMBINATION | S1 | S2 | S3 | S4 | S5 |
| CODE COMBINATION | S1 | S2 | S3 | S4 | S5 |
| CODE COMBINATION | S1 | S2 | S3 | S4 | S5 |
| CODE COMBINATION | S1 | S2 | S3 | S4 | S5 |

At 865 any output codes resulting from the prior processing of the key codes are written to the key or key-like device (e.g., to change one or more function codes of a key 30). At 866 the CPU determines whether the function processing had resulted in an "authorize access" state, and if such state is present actuates the Release Driver 130 at 868 to open the lock. In the absence of an "authorize access" flag the system enters a "time out" state at 867, wherein the timing logic 120 clocks a predetermined time interval during which the Key Sensing logic 150 is not permitted to output a valid key insertion signal Time out step 867 limits the frequency with which an unauthorized user can feed a large number of random codes to the logic 100 using a key-like device. The time out state may be effected after a prescribed number of key insertions. At 869 the Power Control assembly 140 turns off the supply of power to CPU 105 and Release Driver 130.

ACCESS CODE MEMORY STRUCTURE

Table 1 shows an advantageous memory map for access codes contained within the cylinder or door unit EEPROM 180 (FIG. 12). This memory map schematically illustrates the logical addressing scheme of the,-lock's control program to sequentially retrieve data from memory cells within EEPROM 180, but does not necessarily depict the physical layout of such memory cells. Memory 180 includes various fixed format fields—fields with a predetermined number of assigned data bits, and a variable format portion for function storage. Fixed format fields includes a "door unit identification''—a serial number that identifies the particular cylinder 50, but has no security function; and the "programming code", a security code which must be transmitted to cylinder logic 100 in order to allow modification of memory 180, as discussed below under MANAGEMENT SYSTEM. Other fixed format fields not shown in Table 1 may be included depending on the requirements of the door unit firmware. The function storage fields contain the data associated with the particular keying system functions programmed into Cylinder Access Code Memory 180; this is illustrated in Tables 2 and 3.

Illustratively, key memory 40 is structured similarly to the cylinder code map of Table 1, but omits the Programming Code field.

Table 2 illustrates the record structure of a particular keying system feature—i.e. the Zone function. In its basic embodiment, the Zone function implements a comparison of each of a set of key zone codes with each of a set of cylinder zone codes, and permits access if any match occurs. The header byte of this memory map gives the number of zone function records (here four). Together with preknowledge of the memory occupied by the records of each function, the header byte enables the addressing routine to scan through logical memory to locate the next function within Function Storage (Table 1). In each record, the code combination represents the code which must be matched to initiate the corresponding function. The status bits S1-S5 are associated with specialized Zone features, so that the setting of a particular use bit (at most one is set) identifies the code combination with that feature. For example, S1 might be associated with "one use"—which allows keys to be issued for one time use only; and S2 might be identified with "electronic lockout"—permits a special lockout key to prevent access by normal keys, until the lockout key is reused. If no status bit S1-S5 is set, the code combination will be a Basic Zone code, discussed above.

In the key memory 40 and cylinder memory 180, access codes are assigned a given code width (number of binary digits per code) which determines by inverse relationship the total number of available codes in EEPROM. Higher code widths will decrease processing speed, but increase the resistance of the system to fraudulent access attempts by means of random codes electrically fed to the lock; in addition higher-width codes are less likely to be inadvertently duplicated in system management. By decreasing the total number of available codes, however, the one of higher width codes decreases the number of available keying system features for a given amount of memory. In the preferred design of cylinder logic 100 (FIG. 12), Power Control 140 is Controlled by Central Processor 105 and Timing Assembly 120 to provide a "time out" period after the sequential presentation of a certain number of unauthorized key codes, as discussed above with reference to FIG. 13.

TABLE 3

| SIMPLIFIED MEMORY MAP DOOR ZONE FUNCTION | |
|---|---|
| NUMBER OF RECORDS | |
| CODE COMBINATION | S1 |
| CODE COMBINATION | S1 |
| CODE COMBINATION | S1 |

TABLE 4

| SIMPLIFIED MEMORY MAP KEY ZONE FUNCTION |
|---|
| NUMBER OF RECORDS |
| CODE COMBINATION |
| CODE COMBINATION |
| CODE COMBINATION |
| CODE COMBINATION |
| CODE COMBINATION |

KEYING SYSTEM

Figure 14:
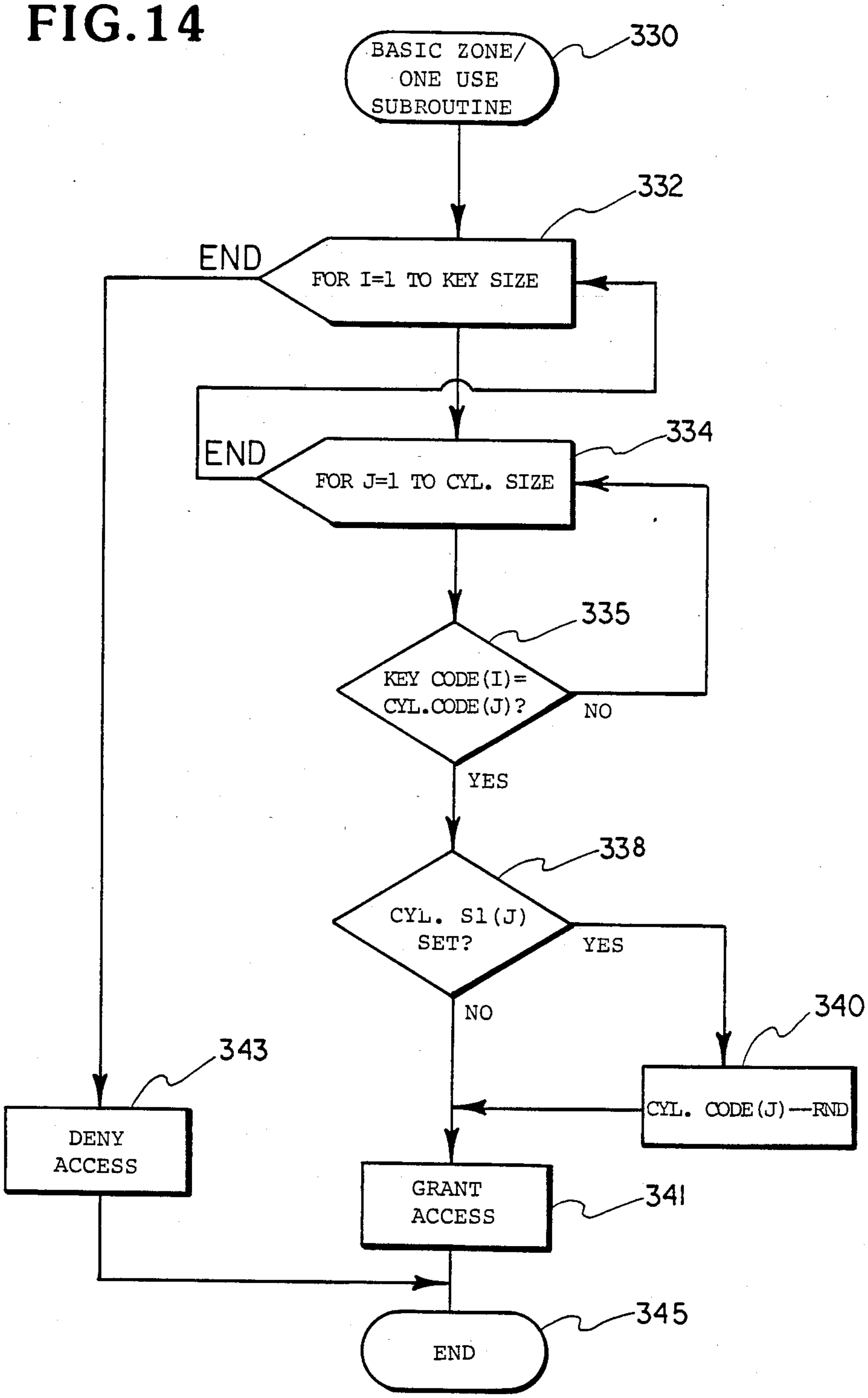
FIG. 14 is a flow chart schematic diagram of a Basic Zone/One Use Subroutine for the cylinder logic of FIG. 20.

Tables 3 and 4 give simplified record structures for cylinder and key memory function storage fields for Basic Zone and One Use functions, and should be referenced together with the flow chart schematic diagram of FIG. 14 to illustrate the relationship between the access code memory structures and the associated keying system software routines in ROM 170. The door unit or cylinder record structure includes three Zone records with associated "one use" status bits S1 (Table 3), while the key memory structure contains five Zone records but no associated status or use bits (Table 4).

In the basic system program of FIG. 13, as part of the "select functions" case block, the control firmware would include various subroutines associated with particular keying system features, including the "Basic Zone/One Use Subroutine" of FIG. 14 This routine includes nested loops wherein key pointer I (e.g. pointing to a particular record or row of Table 4) and cylinder pointer J (e.g. pointing to a given cylinder zone record—cf Table 3) are each incremented from 1 to the respective "Number of Records" value. For each pair of values I, J, this routine compares the "code combination" for the relevant cylinder and key zone records at step 335 If a match is found the program determines at 338 whether the CYL.S1 flag for the relevant record J is set. If this "one use" flag is not set, the routine simply returns a "grant access" decision at 341. If the flag is set, however, the routine first updates CYCLODE (J) with a pseudorandom number generated by the management system; this prevents a repeated use of the key to open the same lock cylinder.

Were the Zone Function data structure to take the more complicated form shown in Table 2, the subroutine of FIG. 14 would be modified to determine whether any of the other status or use bits S2-S5 were set, and to include appropriate algorithms to implement these additional keying system features.

The locking system of the invention can achieve all of the traditional keying system features found in mechanical mortice cylinders (e.g., great grand master keying, cross keying, etc.), as well as additional, useful functions. Furthermore, the cylinder access code memory 180 can include updating key codes, which may be written to the key memory 41 in implementing certain keying system functions. Specialized keying system functions may be designed to control unauthorized copying of key codes, and in general to selectively update the key memory 40 for enhanced flexibility together with security.

In the embodiment in which the cylinder electronics 100 includes a real time clock, the keying system can be extended to include time-of-day control Time-of-day can be associated with each keying function. For Basic Zone/Single Use, a time can be associated with each door unit zone (i.e., set of lock cylinders containing a common zone code). The key system functions could be modified to include one or more time access windows, to include automatic cylinder recording at a given time of day, and other features. The cylinder memory structure must be supplemented with time-of-day codes, i.e. one byte for each significant time-of-day. With reference to the Management System discussion below, the key/initialization console 350, and central controller 360, must have the ability to keep time-of-day in such a system.

By including a calendar timing device on the Timing Assembly 120 (FIG. 13), the principles discussed above can be applied to keying system features tied to particular days, weeks, etc.

MANAGEMENT SYSTEM

Figure 16:
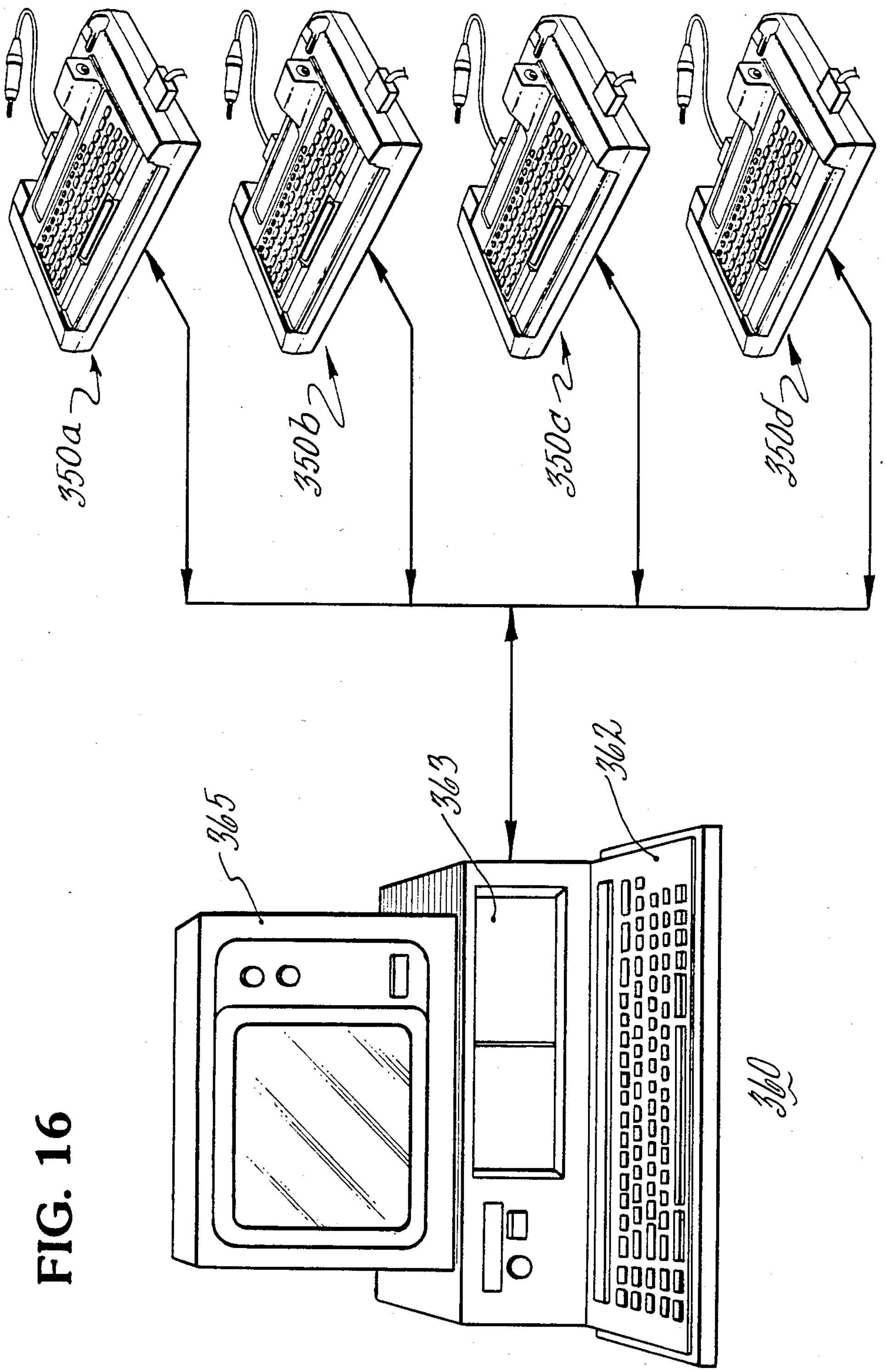
FIG. 16 is a schematic view of a preferred management system configuration for the electronic locking system of FIG. 1, embodying the console of FIG. 15.

The electronic locking systems of the invention may be incorporated in "hard-wired" electronic lock installations, which utilize a communication network linking the various lock cylinders, and a central management system processor. In the preferred embodiment of the invention, however, the lock cylinder 50 comprises a stand-alone system, with no hard-wired communication. The EEPROM elements 41 within each key 30 serve as a substitute for a direct communication link with a central controller, inasmuch as the key can be encoded at a remote station to transmit codes to lock cylinder 50. Key 30 can be encoded with special codes which are recognized by cylinder access code memory 180. As shown in FIG. 16, the management system advantageously includes one or more key/cylinder consoles 350, which may take the form for example of a portable microcomputer with specialized input/output devices. Key receptacle 352 accepts insertion of a key 30, and links the inserted key to internal logic circuity for initializing or recoding a key. Cylinder recombinating device 355 includes a key blade 356 similar to a normal key blade 33 (FIG. 8), and a plug 357 which mates with an outlet (not shown) at the rear of console 350. The cylinder recombinating device 355 contains EEPROM memory essentially identical to the key memory 40, and may be used by authorized operators to carry a new program from the console 350 to a given cylinder as required by the management system.

The management system is advantageously adapted to the requirements of institutional users such as hotels and universities. With reference to FIG. 17, the system might include a plurality of "clerk consoles" 350*a–d* in accordance with the device of FIG. 16, which communicate with a central controller 360. Controller 360 acts as the central repository of the management system data base for the entire installation, and downloads data into the various consoles 50*a–d*. Consoles 350*a–d* encode keys as required by the keying system data base, and records to whom they are issued. A given console 350 can interrogate the central controller 360 to inspect the central database; sensitive information can be protected by features such as passwords. This preferred management system may be characterized as a distributed processing system, with all real time processing effected at individual lock cylinders 50.

While reference has been made above to specific embodiments, it will be apparent to those skilled in the art that various modifications and alterations may be made thereto without departing from the spirit of the present invention. Therefore, it is intended that the scope of this invention be ascertained by reference to the following claims.

We claim:

1. A key for an electronic lock comprising a cylinder shell and a cylinder plug rotatable within said cylinder shell, said cylinder plug including a keyway for receiving said key, an electronically actuable release assembly within the cylinder shell, said release assembly having a locking member which selectively engages the plug to prevent the rotation thereof and disengages the plug in response to an actuating signal to allow the rotation thereof, control logic for generating said actuating signal in response to a match between electronically coded key information on said key and electronic cylinder codes contained within said control logic, and first ohmic contact means within said lock for communicating with said control logic; said key comprising:

means defining a cavity substantially surrounded by metal, an electronic memory device supported within said cavity means and having leads for communicating with said memory device, a metal key blade insertable through said keyway, second ohmic contact means located on said blade but electrically insulated from said blade, and electrically connected to said leads of said memory device for mating with said first ohmic contact means upon insertion of said key in said keyway whereby said contol logic is able to communicate with said memory device, and electro-static discharge protection means connected between memory cells within said memory device and said second ohmic contact means for protecting said memory cells against static charge entering said cavity means via said second ohmic contact means.

2. A key as defined in claim 1, wherein the memory devices within the key comprises non-volatile, electronically eraseable, programmable read only memory (EEPROM).

3. A key as defined in claim 1 wherein said cavity means is located within the key blade.

4. A key as defined in claim 1 wherein the memory device within the key is housed in a surface mounted package.

5. A key as defined in claim 3, wherein the memory device within the key blade is mounted on an electrically insulating substrate.

6. A key as defined in claim 1, wherein the key blade is substantially flat.

7. A key as defined in claim 6 further comprising a substantially flat key head.

8. A key for an electronic lock comprising a cylinder shell and a cyliner plug rotatable within said cylinder shell, said cylinder plug including a keyway for receiving said key, an electronically actuable release assembly within the cylinde shell, said release assembly having a locking member which selectively engages the plug to prevent the rotation thereof and disengages the plug in response to an actuating signal to allow the rotation thereof, control logic for generating said actuating signal in response to a match between electronically coded key information on said key and electronic cylinder codes contained within said control logic assembly, and first ohmic contact means within said lock for communicating with said control logic; said key comprising:

means defining a cavity substantially surrounded by metal, a non-volatile, electronic memory device supported within said cavity means and having leads for communicating with said memory device, a metal key blade insertable through said keyway, and second ohmic contact means located on said blade but electrically insulated from said blade, and electrically connected to said leads of said memory device for mating with said first ohmic contact means upon insertion of said key in said keyway whereby said control logic is able to communicate with said memory device, and wherein said key is generally flat.

9. A key as defined in claim 8 wherein the cavity means is located in said key blade.

* * * * *